(12) United States Patent
Lin et al.

(10) Patent No.: US 11,748,856 B2
(45) Date of Patent: Sep. 5, 2023

(54) COMPUTER APPARATUS AND METHOD FOR DETECTING DEFECTS IN NEAR-EYE DISPLAY

(71) Applicant: Quanta Computer Inc., Taoyuan (TW)

(72) Inventors: Yeh Lin, Taoyuan (TW); Wen-Chu Yang, Taoyuan (TW); Chi-Hsien Yang, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 261 days.

(21) Appl. No.: 17/215,835

(22) Filed: Mar. 29, 2021

(65) Prior Publication Data

US 2022/0207664 A1 Jun. 30, 2022

(30) Foreign Application Priority Data

Dec. 30, 2020 (TW) ................................. 109146757

(51) Int. Cl.
*G06T 5/00* (2006.01)
*G06T 5/10* (2006.01)
*H04N 23/73* (2023.01)

(52) U.S. Cl.
CPC .............. *G06T 5/005* (2013.01); *G06T 5/002* (2013.01); *G06T 5/009* (2013.01); *G06T 5/10* (2013.01);
(Continued)

(58) Field of Classification Search
CPC ......... G06T 5/005; G06T 5/002; G06T 5/009; G06T 5/10; G06T 2207/20208; G06T 2207/20021; G06T 2207/20056; G06T 2207/30121; G06T 7/001; G06T 7/11; G06T 7/136; G06T 7/44; G06T 7/70; G06T 2207/10004; G06T 2207/20224; H04N 23/70; H04N 23/73; H04N 23/80; H04N 23/81; H04N 25/60; H04N 25/61;
(Continued)

(56) References Cited

U.S. PATENT DOCUMENTS 9,979,956 B1* 5/2018 D'Amico .................. G06T 7/11
2003/0086608 A1* 5/2003 Frost .................. G01N 21/6456
382/199

(Continued)

*Primary Examiner* — Bobbak Safaipour
*Assistant Examiner* — Benedict E Lee
(74) *Attorney, Agent, or Firm* — McClure, Qualey & Rodack, LLP (57) ABSTRACT

A method for detecting defects in a near-eye display is provided. The method includes the following steps: obtaining a reference image and a DUT image according to a first image and a second image captured by a camera through a Fresnel lens when a display panel respectively displays a test-pattern image and a test-background image; performing a fast Fourier transform on the reference image and the DUT image to obtain a frequency-domain reference image and a frequency-domain DUT image; calculating an average value of pixel values above a predetermined cut-off ratio in a histogram of each first region of interest (ROI) in a filtered frequency-domain reference image as a corresponding threshold; comparing each pixel in the filtered DUT image with the corresponding threshold to generate a determination result; and building a defective-status map of the near-eye display according to the determination results.

9 Claims, 7 Drawing Sheets

(52) U.S. Cl.
CPC ... *H04N 23/73* (2023.01); *G06T 2207/20208* (2013.01)

(58) Field of Classification Search
CPC ........ H04N 25/62; H04N 25/63; H04N 25/64; H04N 25/65; H04N 25/66; H04N 25/67; H04N 25/68; H04N 5/253
See application file for complete search history.

(56) References Cited

U.S. PATENT DOCUMENTS

| | | | |
|---|---|---|---|
| 2011/0176024 A1* | 7/2011 | Kwon | H04N 23/951 |
| | | | 348/222.1 |
| 2018/0078123 A1* | 3/2018 | Seki | G06T 7/55 |
| 2022/0164971 A1* | 5/2022 | Hegarty | G06T 7/521 |

* cited by examiner

COMPUTER APPARATUS AND METHOD FOR DETECTING DEFECTS IN NEAR-EYE DISPLAY

CROSS REFERENCE TO RELATED APPLICATIONS

This Application claims priority of Taiwan Patent Application No. 109146757, filed on Dec. 30, 2020, the entirety of which is incorporated by reference herein.

BACKGROUND OF THE INVENTION

Field of the Invention

The present invention relates in general to image processing, and, in particular, to a computation apparatus and a method for detecting defects in a near-eye display.

Description of the Related Art

Near-eye displays (NEDs) such as virtual-reality (VR) devices and augmented-reality (AR) devices have become more popular as the technology has advanced. However, current near-eye displays often use an optical module (e.g., a Fresnel lens) with a field of view that is greater than 90 degrees, and the imaging quality of the peripheral area is poor. For manufacturers of near-eye displays, it is necessary to detect defects (including blemishes and bright dots) after the near-eye display is assembled. Based on the aforementioned optical characteristics, it is very difficult to accurately determine the blemishes and bright dots on the display panel and optical module of the near-eye display using conventional computer-vision technology and manual visual inspection.

Therefore, there is need for a computation apparatus and a method for detecting defects in a near-eye display to solve the above problem.

BRIEF SUMMARY OF THE INVENTION

In an exemplary embodiment, a method for detecting defects in a near-eye display is provided. The near-eye display comprises a display panel and a Fresnel lens. The method includes the following steps: obtaining a reference image and a device-under-test (DUT) image according to a first image and a second image captured by a camera through the Fresnel lens when the display panel respectively displays a test-pattern image and a test-background image; performing a fast Fourier transform respectively on the reference image and the DUT image to obtain a frequency-domain reference image and a frequency-domain DUT image; applying a band-pass filter is respectively to the frequency-domain reference image and the frequency-domain DUT image to obtain a first filtered image and a second filtered image; respectively dividing the first filtered image and the second filtered image into a plurality of first regions of interest (ROIs) and a plurality of second ROIs, wherein the first ROIs correspond to the second ROIs; calculating pixel values in each first ROI to obtain a histogram that corresponds to each first ROI, and calculating an average value of the pixel values that are above a predetermined cut-off ratio in the histogram corresponding to each first ROI as a threshold of each first ROI; building a threshold map that includes the threshold of each first ROI in the first filtered image, and comparing each pixel in each second ROI in the second filtered image with the corresponding threshold in the threshold map to generate a determination result for each pixel in the second filtered image; and building a defective-status map of the near-eye display according to the determination result of each pixel in the second filtered image.

In some embodiments, the method performs blemish detection, and the first image and the second image are the reference image and the DUT image, respectively. The test-background image is a white image, and the test-pattern image is the test-background image covered with a plurality of test points.

In some embodiments, the first image and the second image are HDR (high dynamic range) images respectively obtained by performing image fusion on a plurality first exposure images and a plurality of second exposure images, and the first exposure images and the second exposure images are captured by a camera with different exposure settings when the near-eye display displays the test-pattern image and the test-background image, respectively.

In some other embodiments, the method performs bright-dot detection. The test-background image comprises a central region and an outer region, and the central region and the outer region have a first greyscale value and a second greyscale value. The second greyscale value is greater than the first greyscale value, and the test-pattern image is the test-background image covered with a plurality of test points. The central region is a region within a FoV (field of view) range from 0 to 0.5 in the test-background image, and the outer region is another region within the FoV range from 0.5 to 1 in the test-background image.

In some embodiments, the first image and the second image are HDR (high dynamic range) images obtained by performing image fusion on a plurality first exposure images and a plurality of second exposure images, and the first exposure images and the second exposure images are captured by the camera with different exposure settings when the near-eye display displays the test-pattern image and the test-background image, respectively.

In some embodiments, the step of obtaining a reference image and a device-under-test (DUT) image according to a first image and a second image captured by a camera through the Fresnel lens when the display panel respectively displays a test-pattern image and a test-background image includes the following steps: performing an image-blurring process on the first image and the second image to obtain a blurred first image and a blurred second image, respectively; subtracting the blurred first image and the blurred second image respectively from the first image and the second image to obtain a first difference image and a second difference image; performing an image-clipping process on the pixels having pixel values that are less than 0 in the first difference image and the second difference image to respectively obtain a first clipped-difference image and a second clipped-difference image; and setting the first clipped-difference image and the second clipped-difference image as the reference image and the DUT image, respectively.

In some embodiments, the threshold of each first ROI decreases with the distance of each first ROI from the center of the first filtered image.

In another exemplary embodiment, a computation apparatus for detecting defects in a near-eye display is provided. The near-eye display comprises a display panel and a Fresnel lens. The computation apparatus includes a non-volatile memory and a processor. The non-volatile memory is configured to store a defect-detecting program. The processor is configured to execute the defect-detecting program to perform the following steps: obtaining a reference image and a device-under-test (DUT) image according to a first image and a second image captured by a camera through the Fresnel lens when the display panel respectively displays a test-pattern image and a test-background image; performing a fast Fourier transform respectively on the reference image and the DUT image to obtain a frequency-domain reference image and a frequency-domain DUT image; applying a band-pass filter is respectively to the frequency-domain reference image and the frequency-domain DUT image to obtain a first filtered image and a second filtered image; respectively dividing the first filtered image and the second filtered image into a plurality of first regions of interest (ROIs) and a plurality of second ROIs, wherein the first ROIs correspond to the second ROIs; calculating pixel values in each first ROI to obtain a histogram that corresponds to each first ROI, and calculating an average value of the pixel values that are above a predetermined cut-off ratio in the histogram corresponding to each first ROI as a threshold of each first ROI; building a threshold map that includes the threshold of each first ROI in the first filtered image, and comparing each pixel in each second ROI in the second filtered image with the corresponding threshold in the threshold map to generate a determination result for each pixel in the second filtered image; and building a defective-status map of the near-eye display according to the determination result of each pixel in the second filtered image.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It must be understood that the words "including", "including" and other words used in this specification are used to indicate the existence of specific technical features, values, method steps, operations, elements and/or components, but not It is not excluded that more technical features, values, method steps, job processing, elements, components, or any combination of the above can be added.

Words such as "first", "second", and "third" used in the claims are used to modify the elements in the claims, and are not used to indicate that there is an order of priority, antecedent relationship, or It is an element that precedes another element, or the chronological order of execution of method steps, which is only used to distinguish elements with the same name.

Figure 1A:
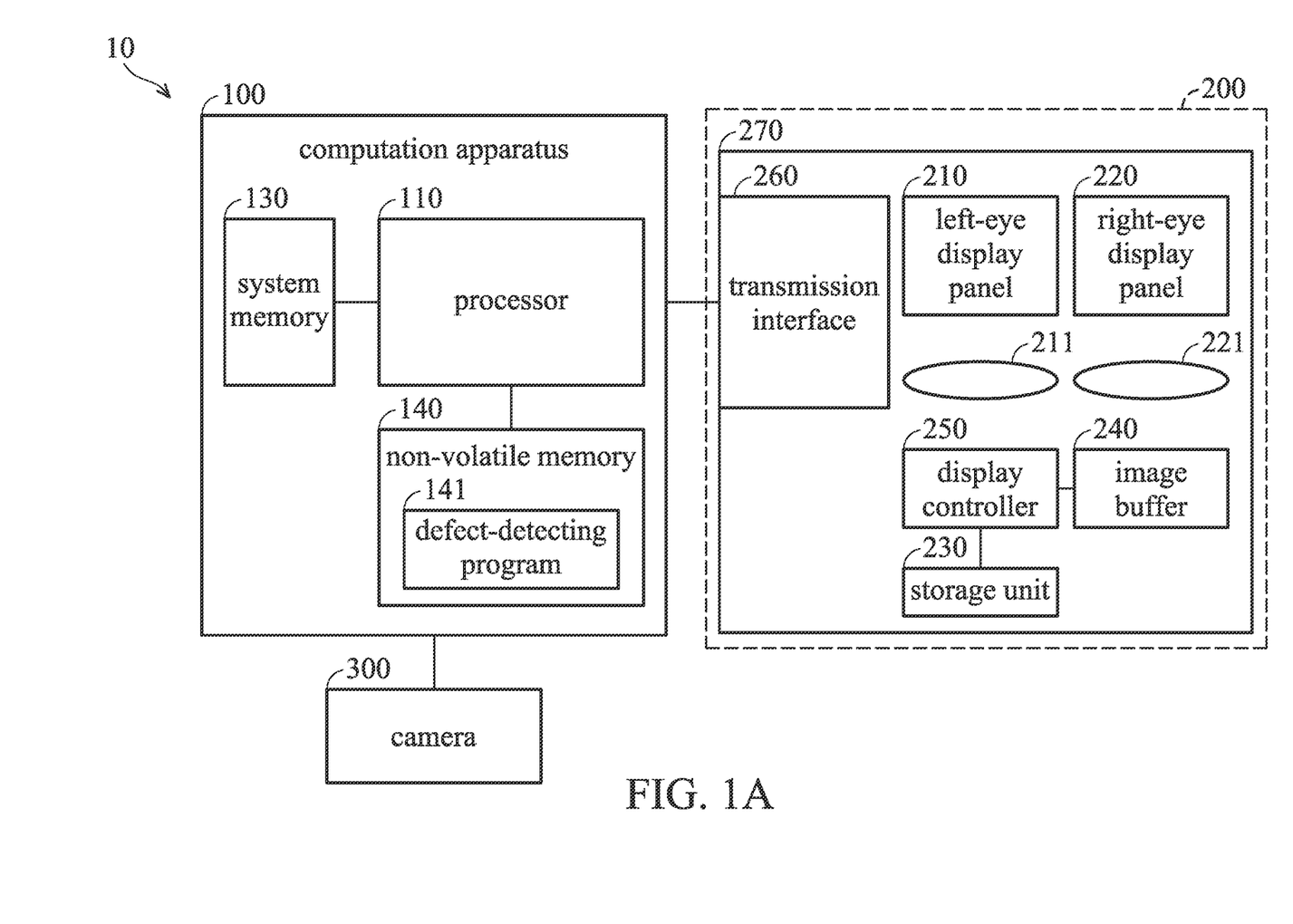
FIG. 1A is a block diagram of a defect-detecting system in accordance with an embodiment of the invention.
Figure 1B:
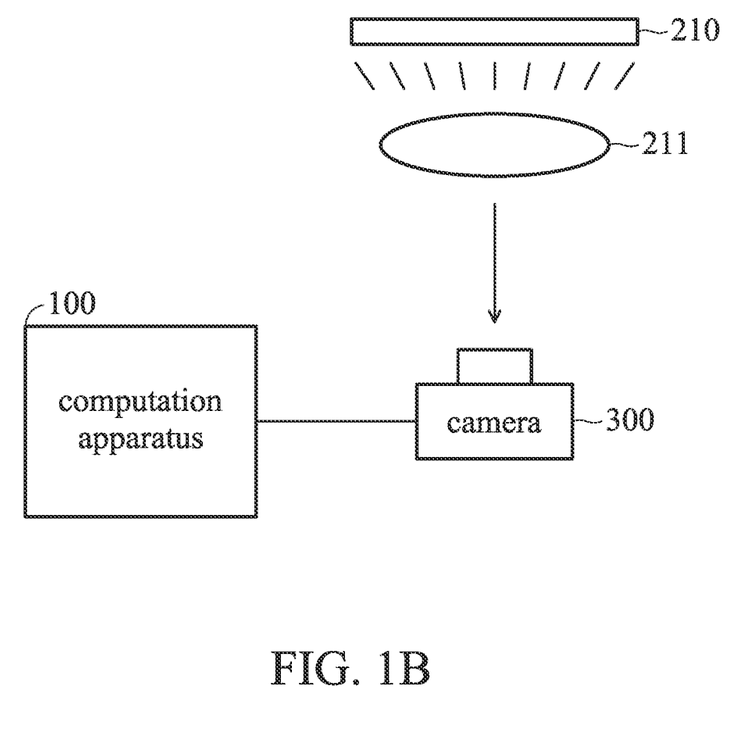
FIG. 1B is a diagram of an image of a near-eye display captured by a camera in accordance with an embodiment of the invention.

FIG. 1A is a block diagram of a defect-detecting system in accordance with an embodiment of the invention. FIG. 1B is a diagram of an image of a near-eye display captured by a camera in accordance with an embodiment of the invention.

As depicted in FIG. 1A, the defect-detecting system 10 may include a computation apparatus, a near-eye display 200, and a camera 300. The computation apparatus 100 may be a personal computer, a server, or other apparatuses having computation capability such as a microcontroller, a field-programmable gate array (FPGA), a complex programmable logic device (CPLD), an application-specific integrated circuit (ASIC), etc., but the invention is not limited thereto. In an embodiment, the computation apparatus 100 may include a processor 110, a system memory 130, and a non-volatile memory 140. The non-volatile memory 140 may store a defect-detecting program 141, and the processor 110 may read the defect-detecting program 141 to the system memory 130 for execution. The defect-detecting program 141 may perform the method for detecting defects in the invention, and the details will be described later.

The near-eye display (NED) 200 may be, for example, a virtual-reality (VR) or augmented-reality (AR) head-mounted display (HMD). For convenience of description, the near-eye display is a VR apparatus as an example.

The near-eye display 200 may be a head-mounted display, and may include a left-eye display panel 210 and its corresponding lens 211, a right-eye display panel and its corresponding lens 221, a storage unit, an image buffer 240, a display controller 250, and one or more transmission interfaces 260, and a housing 270. The left-eye display panel 210, lens 211, right-eye display panel 220, lens 221 are disposed within the housing 270 in a predetermined optical arrangement, and the housing 270 may include a strap or other auxiliary device (not shown) that can be wear on the head of the user to view the VR screen through the near-eye display 200.

The left-eye display panel 210 and right-eye display panel 220 may be, for example, liquid-crystal display panels, light-emitting diode (LED) panels, organic light-emitting diode (OLED) panels, flexible display panels, or display panels of other types, but the invention is not limited thereto. In some embodiments, the left-eye display panel 210 and right-eye display panel 220 may be different and separate display panels, or be implemented by the same display panel, where the left-eye display panel 210 and right-eye display panel 220 are side by side and parallel to each other, and there is no angle difference between these two display panels. In some other embodiments, the left-eye display panel 210 and right-eye display panel 220 are side by side, but not parallel to each other, where there is an angle difference between these two display panels.

The lenses 211 and 221 can be implemented by, for example, a single Fresnel lens or a combination of multiple Fresnel lenses, or a combination of other optical lenses with similar functions, but the invention is not limited thereto.

The transmission interface 260 may include a wired transmission interface and/or a wireless transmission interface. The wired transmission interface may include HDMI (High Definition Multimedia Interface), DP (DisplayPort), eDP (embedded DisplayPort), USB (Universal Serial Bus), USB Type-C interface, Thunderbolt interface, DVI (Digital Video Interface), or a combination thereof. The wireless transmission interface may include a 5th-generation wireless system, Bluetooth, Wi-Fi, NFC (near-field communication) interface, etc., but the invention is not limited thereto. The host 100 may transmit an image signal (e.g., may including a left-eye image and a right-eye image, or a planar image) to the display controller 250 through the transmission interface 260, and the display controller 250 can display the image signal on the left-eye display panel 210 and right-eye display panel 220.

The display controller 250 may be, for example, an application-specific integrated circuit (ASIC), a system-on-chip (SoC), a processor, or a microcontroller, but the invention is not limited thereto. The storage unit 230 may be a non-volatile memory such as a read-only memory (ROM), an erasable programmable read-only memory (EPROM), an electrically erasable programmable read-only memory (EE-PROM), a flash memory, etc., but the invention is not limited thereto. The storage unit 230 is configured to store firmware and test images corresponding to the near-eye display 200. The storage unit 230 may be disposed outside the display controller 250, or be integrated into the display controller 250. The image buffer 240 may be, for example, a dynamic random access memory that is configured to temporarily store the image signal to be displayed.

The camera 300 is electrically connected to the computation apparatus 100, and is capable of capturing the display screen of the near-eye display 200 on one side of the left eye or right eye in the viewing area (or imaging area), wherein the viewing area may be the viewing position (or imaging position) of the user's eyes while the user uses the near-eye display 200 to view an image. For example, the left-eye display panel 210 can display a test image and a reference image, and these images can be captured by the camera 300 through the lens 211, as shown in FIG. 1B. In addition, the right-eye display panel 220 can also display a test image and a reference image, and these images can be captured by the camera 300 through the lens 221. It should be noted that before the near-eye display 200 is shipped from the factory, both the left-eye display panel 210 and the right-eye display panel 220 need to undergo blemish and bright-dot detection to filter out the problematic near-eye display 200 to ensure the image quality of the near-eye display 200, wherein the blemishes and bright dots can be collectively referred to as defects.

Figure 2A:
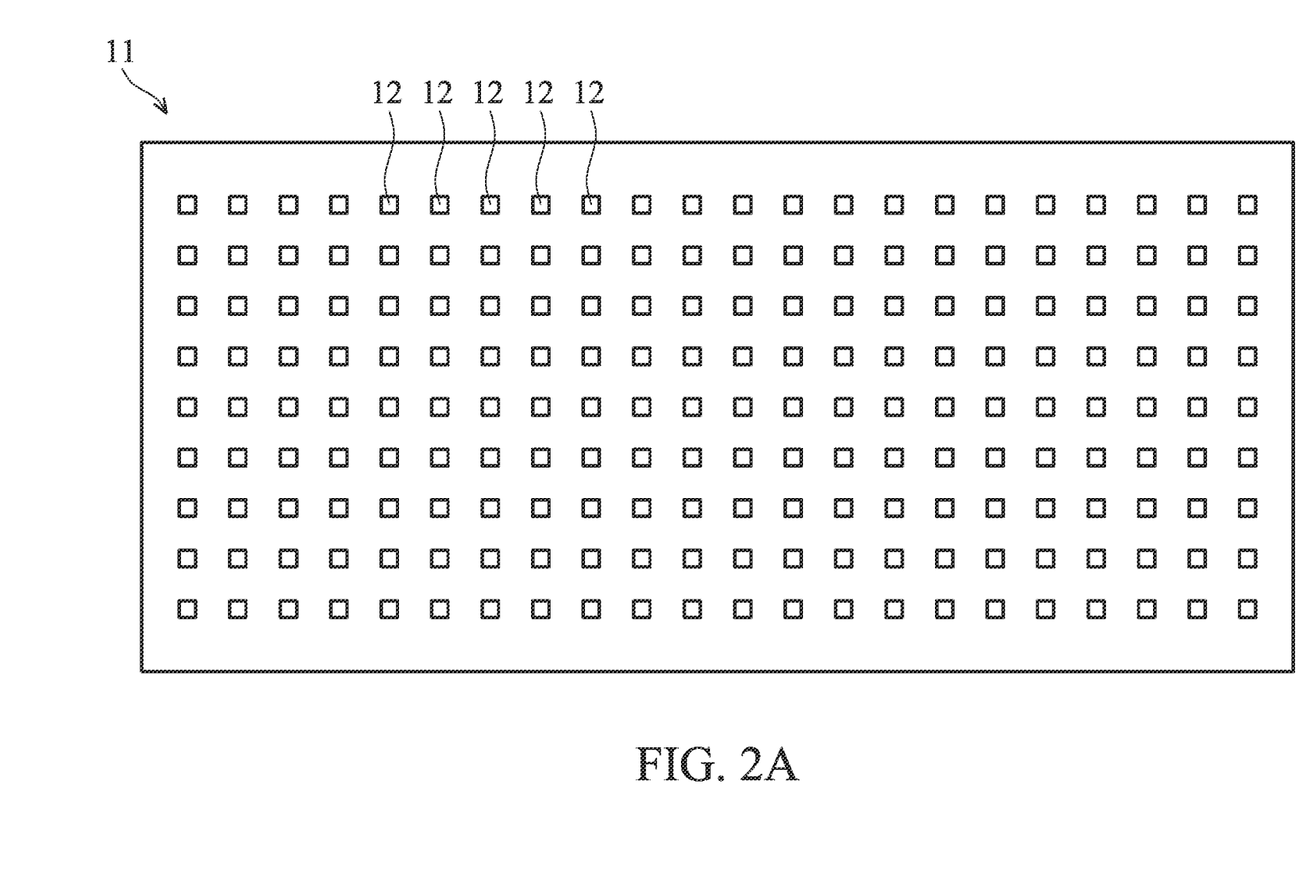
FIG. 2A is a diagram of a test-pattern image in accordance with an embodiment of the invention.

FIG. 2A is a diagram of a test-pattern image in accordance with an embodiment of the invention. Please refer to FIGS. 1A-1B and FIG. 2A.

In an embodiment, the near-eye display 200 can be regarded as a device under test (DUT). The near-eye display 200 can first display a test-pattern image 11, as shown in FIG. 2, wherein the test-pattern image 11 may be a white image covered with a plurality of test points 12. It should be noted that the test-pattern image 11 shown in FIG. 2 is for illustration, and the test points 12 on the test-pattern image 11 can be randomly distributed, and are not limited to a regular arrangement. In addition, the test points 12 can be of any size and shape, and be not limited to square test points. The test points 12 can also have any brightness and color, and be not limited to the black test points (i.e., greyscale=0). The camera 300 can capture the test-pattern image 11 displayed by the left-eye display panel 210 of the near-eye display 200 through the lens 211 to obtain a first image.

Afterwards, the near-eye display 200 can further display a test-background image, wherein the test-background image may be a white image (e.g., brightness values of red, green, and blue pixels are 255) without any test points. The camera 300 can capture the test-background image displayed by the left-eye display panel 210 of the near-eye display 200 through the lens 211 to obtain a second image. In the embodiment, the first image and second image can be regarded as a reference image and a DUT image, respectively.

Alternatively, the computation apparatus 100 can use the high-dynamic range (HDR) technology to obtain the reference image and the DUT image. For example, when the near-eye display 200 displays the test-pattern image, the camera 300 may capture a plurality of exposure images with different exposure settings (e.g., exposure time, sensitivity of the image sensor, etc.), and perform image fusion on the exposure images to obtain the second image. The first image and the second image can be regarded as a reference image and a DUT image.

The computation apparatus 100 can obtain the reference image and DUT image from the camera 300, and perform fast Fourier transform (FFT) on the reference image and the DUT image to obtain a frequency-domain reference image and a frequency-domain DUT image, respectively. Then, the computation apparatus 100 may apply a band-pass filter to the frequency-domain reference image and the frequency-domain DUT image to obtain a first filtered image and a second filtered image, respectively, wherein each pixel value in the first filtered image and the second filtered image may be a normalized value between 0 and 1 that can reflect the variation of each pixel value in the reference image and DUT image. In some embodiments, the computation apparatus 100 can apply a band-pass filter and a de-moire filter on the frequency-domain reference image and the frequency-domain DUT image to obtain the first filtered image and the second filtered image, respectively. One having ordinary skill in the art can apply a well-known band-pass filter and de-moire filter on the frequency-domain reference image and frequency-domain DUT image, and thus the details will be omitted here.

If a specific pixel is a white pixel in the reference image and DUT image and surrounding pixels of the specific pixel are all white pixels, it indicates that the pixel value of the specific value has very little variation in the frequency domain. Thus, after the FFT is performed, the pixel value at the location of the specific pixel in the frequency-domain reference image and the frequency-domain DUT image is approximately equal to 0. If the specific pixel is a black pixel in the reference image and DUT image and surrounding pixels of the specific pixel are all white pixels, it indicates that the pixel value of the specific value has significant variation in the frequency domain. Thus, after the FFT is performed, the pixel value at the location of the specific pixel in the frequency-domain reference image and frequency-domain DUT image has a greater value.

It should be noted that the field of view (FoV) of the lenses 211 and 221 is usually greater than 90 degrees, and the larger the FoV of the lenses 211 and 221, the worse the image quality at the outer region of the image (i.e., having less high-frequency component, which indicates the image is less sharp), resulting in a greater difference in intensity between the center and the outer region of the filtered image.

In addition, if the near-eye display 200 displays a white image without any test points (i.e., the test-background image), each pixel value in the DUT image and reference image captured by the camera 300 may slightly vary due to environmental noise or the noise of the image sensor (not shown) of the camera 300, and thus the frequency-domain DUT image and frequency-domain reference image obtained after the FFT may have many non-zero pixel values which is caused by the aforementioned noises, and it may cause the pixel value of the high-frequency noise in the central area of the image to be higher than the real signal in the outer region of the image, which is not desirable for detecting the blemishes in the overall FoV of the camera 300. Moreover, because the camera 300 performs the aforementioned shooting operation after the near-eye display 200 is assembled, if there is dust or stains on the left-eye display panel 210 and lens 211, or the right-eye display panel 220 and lens 221 in the near-eye display 200, it may also affect the DUT image captured by the camera 300.

Figure 2B:
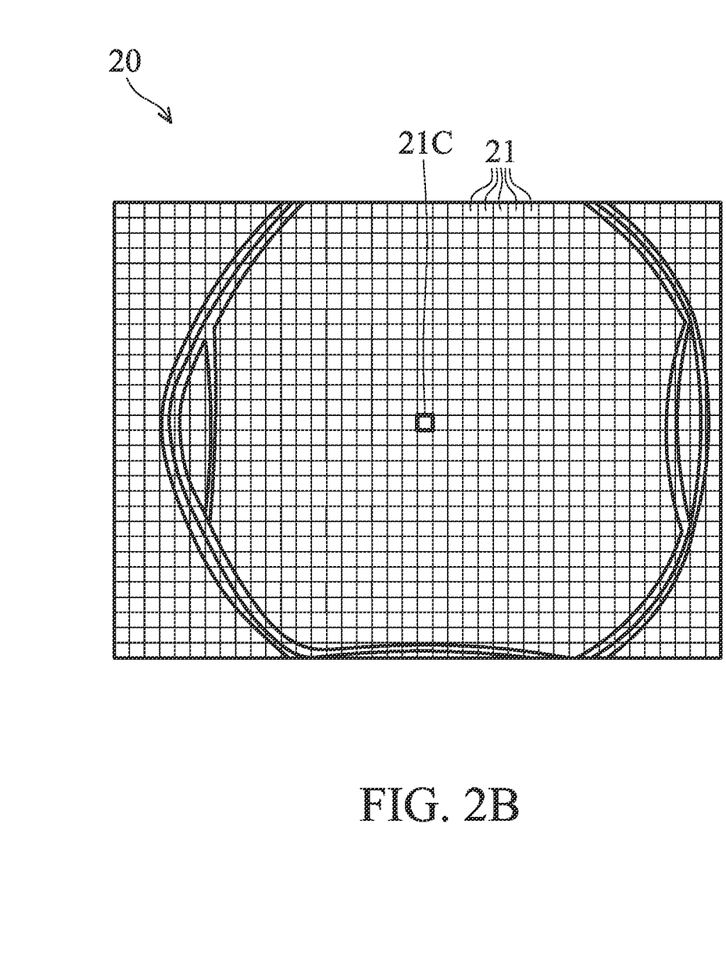
FIG. 2B is a diagram of the first filtered image in accordance with the embodiment of FIG. 2A.

FIG. 2B is a diagram of the first filtered image in accordance with the embodiment of FIG. 2A.

In the embodiment, when the computation apparatus 100 has obtained the first filtered image, the pixel value in the first filtered image corresponding to each test point in the reference image can be known. For example, the test point in the reference image has a pixel value of 0.2 at the central area of the first filtered image with a noise pixel value of 0.03, and has a pixel value of 0.02 at the outer region of the first filtered image with a noise pixel value of 0.01. Accordingly, the computation apparatus 100 may set different threshold values for the regions of interest (ROI) in the central region and outer region to detect the blemishes in the central region and outer region of the DUT image.

Specifically, the computation apparatus 100 may divide the first filtered image 20 and the second filtered image into a plurality of ROIs 21, wherein each ROI 21 may be any shape and size, and is not limited to being square. In addition, each ROI can be randomly distributed in the first filtered image and the second filtered image, which means that there is no fixed format for the area and shape of the ROI at each location. For convenience of description, in the embodiment, each ROI 21 has a fixed size (e.g., 100×100 pixels) and a fixed shape (e.g., a square), as shown in FIG. 2B. If the resolution of the first filtered image 20 is 4000× 3000 pixels, after the aforementioned image-dividing processing, 40×30 ROIs can be obtained.

Then, the computation apparatus 100 may calculate statistics of each pixel value in each ROI of the first filtered image 20 to obtain a histogram that corresponds to each ROI. For example, the computation apparatus 100 may arrange each pixel value in each ROI from low to high, and set a predetermined cut-off ratio. For example, if the cut-off ratio is 99%, it indicates that the computation apparatus 100 may calculate the average value of the pixels from 99% to 100% in the histogram of each ROI, and set the calculated average value to the threshold of each ROI. In some other embodiments, the cut-off ratio can be set to 1%, and the computation apparatus 100 will calculate the average value of the top 1% pixel values in the histogram of each ROI, and set the calculated average value to the threshold of each ROI.

Figure 2C:
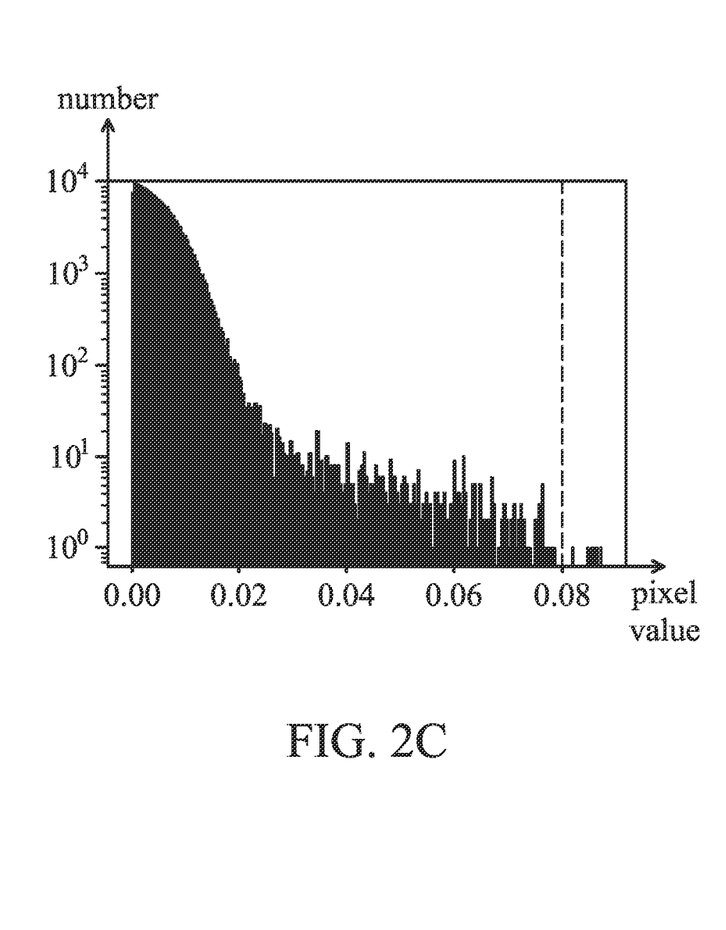
FIG. 2C is a histogram of pixel values in the central ROI of the first filtered image in accordance with the embodiment of FIG. 2A.

FIG. 2C is a histogram of the central ROI 21C in the first filtered image 20, and the computation apparatus 100 may calculate the average value of top 1% pixel values in the histogram of the central ROI 21C as 0.08, and set the calculated average value to the threshold of the central ROI 21C.

After the computation apparatus 100 has calculated the threshold of each ROI using the aforementioned method, the computation apparatus 100 may build a threshold map. The threshold map may be a two-dimensional array, and its size corresponding to the number of ROIs in the first filtered image 20. For example, if the first filtered image 20 is divided into 40×30 ROIs, the threshold map may include 40×30 thresholds, and each threshold corresponding to each ROI.

After the computation apparatus 100 has built the threshold map, the computation apparatus 100 may compare the second filtered image with the threshold map to generate a determination result of each pixel. For example, if the second filtered image is also divided into 40×30 ROIs, each pixel in each ROI will be compared with the threshold in the corresponding location of the threshold map. If the pixel value of a specific pixel in the second filtered image is greater than or equal to the threshold of the corresponding ROI, the computation apparatus 100 will determine that the specific pixel is a blemish. Accordingly, the computation apparatus 100 may build a defective-status map (e.g., a two-dimensional array) of the near-eye display 200 according to the determination result of each pixel, wherein each value in the defective-status map corresponds to the blemish-determination result of each pixel in the DUT image. For example, the determination result of each pixel is a binary value such as 0 or 1, where 1 may represent that the corresponding pixel is a blemish, and 0 may represent that the corresponding pixel is a normal pixel.

It should be noted that, for test points in the first filtered image, the pixel values of the test points in the central region are greater than those in the outer region. After calculation of the histogram and threshold, each value in the threshold map also corresponds to the distance from the center point of the image. That is, the closer the ROI to the center point of the image, the larger the corresponding threshold. The farther away the ROI from the center point of the image, the smaller the corresponding threshold. Therefore, the method for detecting defects in the present invention can more accurately determine defects (e.g., blemishes) in the near-eye display 200.

The defect-detecting system 10 can be used to detect the bright dots of the near-eye display 200. For example, a bright dot is a common defect on a display panel. When the display should turn off a specific pixel, the specific pixel is always bright. In this case, the specific pixel can be regarded as a bright dot. As the degree of defect varies, the brightness of a bright dot may also vary. Generally, the display-panel suppliers can provide detection standards for the bright dots of the display panel. For example, the brightness of bright dots in the FoV range (which can also be regarded as a FoV ratio) of 0 to 0.5 cannot exceed the greyscale value of 55, and the brightness of bright dots in the FoV range of 0.5 to 1.0 cannot exceed the greyscale of 120. The value of the aforementioned FoV range may refer to the distance ratio from the center of the display panel to the left/right edge and the top/bottom edge. Assuming that the horizontal resolution and vertical resolution of the left-eye display panel 210 and the right-eye display panel 220 are W and H, respectively, if the value of FoV range is 0 to 0.5, it means that the FoV extends from the center of the display panel to the left and right by W/4, and to the top and bottom by H/4, and so on.

Conventional bright-dot detection may include manual visual inspection and computer-vision inspection. However, inspectors should be trained for manual inspection, and the display panel is subjectively inspected by humans, which is time-consuming and inaccurate. Computer-vision detection is to display a test image with a fixed grey level. For example, if the goal of detection is to find bright dots with a greyscale value of 55, the greyscale value of the test image can be set to 30, and then test image displayed by the display panel can be captured by an industrial camera, and then a computer can be used for perform bright-dot detection.

However, performing bright-dot detection using conventional computer-vision technology still encounters the problem of blemish detection. In addition, in the near-eye display, the outer region of the image captured by the camera will be blurred, and thus the bright dot cannot be determined by a fixed threshold.

Figure 3:
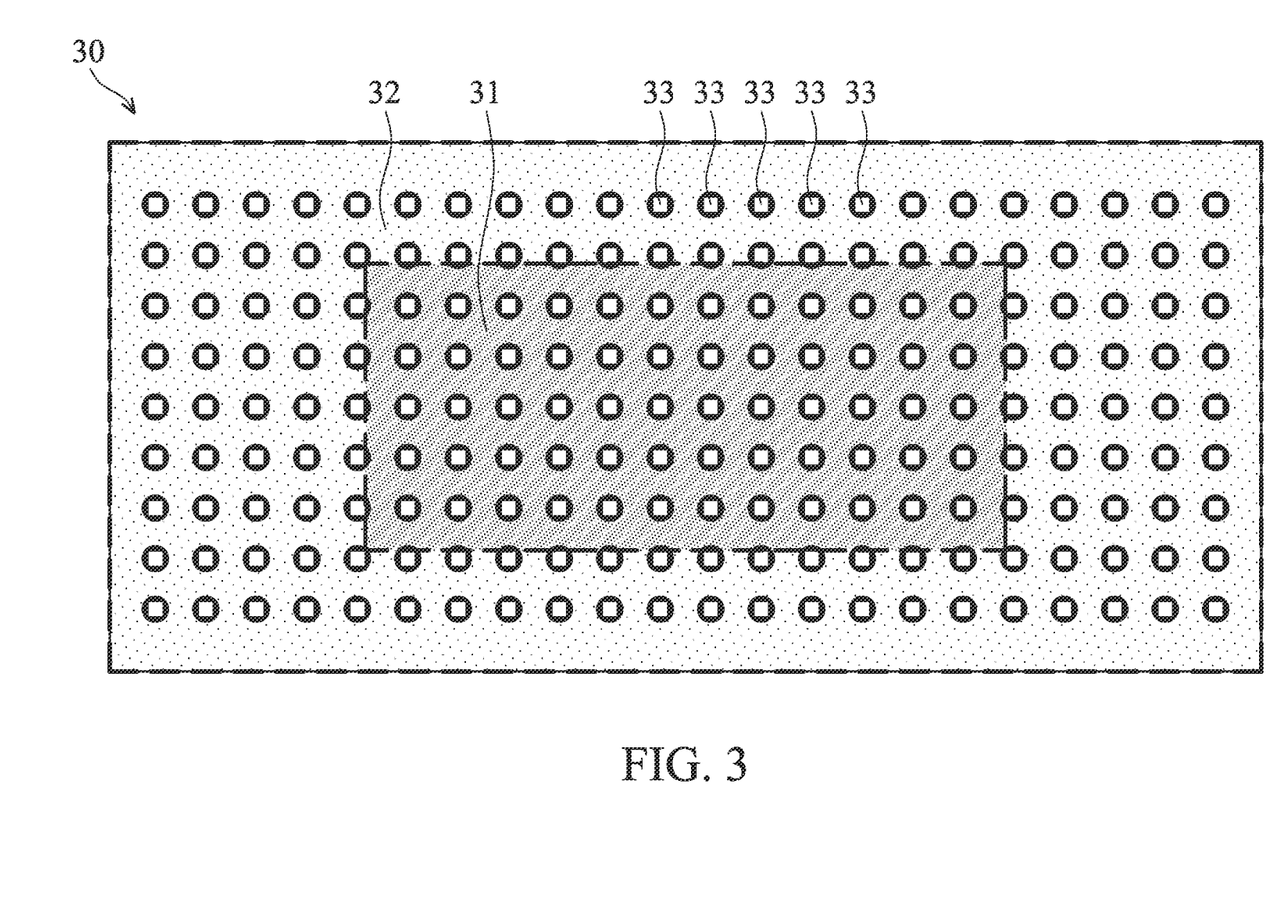
FIG. 3 is a diagram of a test-pattern image for bright-dot detection in accordance with an embodiment of the invention.

FIG. 3 is a diagram of a test-pattern image for bright-dot detection in accordance with an embodiment of the invention.

In an embodiment, the defect-detection system of the present invention can also be used for bright-dot detection. Because the camera 300 performs the shooting operation after the near-eye display 200 is assembled, if there is dust or stains (i.e., blemishes) on the left-eye display panel 210 and lens 211, or the right-eye display panel 220 and lens 221 of the near-eye display 200, the result of bright-dot detection will be affected.

For example, in the embodiment, the test-pattern image 30 for bright-dot detection may include a central region 31 and outer region 32. The central region 31 may be a region within the FoV range from 0 to 0.5, and the greyscale value in the central region 31 is fixed to 55 (not limited). The outer region 32 may be a region within the FoV range from 0.5 to 1, and the greyscale value in the outer region is fixed to 120 (not limited). In addition, the test-pattern image 30 may also have a plurality of test points 33 covering it. It should be noted that the test-pattern image 30 may be any size, color, and distribution. The camera 300 can capture the test-pattern image 30 displayed on the left-eye display panel 210 of the near-eye display 200 through the lens 211 to obtain a first image.

In addition, the near-eye display 200 may subsequently display a test-background image without any test point, and the camera 300 may capture the test-background image displayed on the left-eye display panel 210 of the near-eye display 200 through the lens 211 to obtain a second image.

Then, the computation apparatus 100 may perform an image pre-processing on the first image and the second image to obtain the reference image and DUT image for bright-dot detection. For example, the computation apparatus 100 may perform an image-blurring process on the first image to obtain a blurred first image, and subtract the blurred first image from the first image to obtain a first difference image.

Specifically, before performing bright-dot detection, the computation apparatus 100 needs to remove blemishes in the near-eye display 200. If there is dust or stains (i.e., blemishes) on the left-eye display panel 210 and lens 211, or right-eye display panel 220 and lens 221 of the near-eye display 200, the pixel values of one or more pixels corresponding to the blemishes in the first image will be close to 0, and thus the pixel values of the blemishes may vary greatly in comparison with the greyscale value of their surrounding pixels (e.g., 55 or 120). In addition, the aforementioned image-blurring process may apply a low-pass filter on each pixel and its surrounding pixels in the first image, such as using a finite impulse response (FIR) filter with one or more taps, a Gaussian filter, etc., but the invention is not limited thereto. Accordingly, the pixel values of the blemish pixel and its surrounding pixels in the first image can be smoothed, and the greyscale value of the smoothed blemish pixel is slightly smaller than that of the background pixel in the corresponding location. After the computation apparatus 100 subtracts the blurred first image from the first image, the difference value at the location of the blemish pixel is less than 0, and thus the computation apparatus 100 can find the location of the blemish pixels from the first difference image, and perform a pixel-clipping process on the pixels having pixel values that are less than 0 in the first difference image to obtain a first clipped-difference image. For example, the pixels having pixel values that are less than 0 in the first difference image can be replaced by the difference pixels in the smooth region (i.e., a region where the greyscale value does not change significantly) in the first image, or the pixels having pixel values that are less than 0 in the first difference image are set to 0 to obtain the first clipped-difference image.

Similarly, the computation apparatus 100 may perform an image-blurring process on the second image to obtain a blurred second image, and subtract the blurred second image from the second image to obtain a second difference image. The computation apparatus 100 may find the locations of blemish pixels from the second difference image, and perform an image-clipping process on the pixels having pixel values that are less than 0 in the second difference image. For example, the pixels having pixel values that are less than 0 in the second difference image can be replaced by the difference pixels in the smooth region (i.e., a region where the greyscale value does not change significantly) in the second image, or the pixels having pixel values that are less than 0 in the second difference image are set to 0 to obtain the second clipped-difference image. In the embodiment, the first clipped-difference image and the second clipped-difference image can be respectively regarded as the reference image and DUT image in the defect-detection procedure in the embodiments of FIGS. 2A to 2C.

Accordingly, after the computation apparatus 100 has obtain the reference image and DUT image from the aforementioned procedure, the computation apparatus 100 may perform the defect-detection procedure described in the embodiments of FIGS. 2A to 2C on the reference image and DUT image. Finally, each value in the generated defective-status map corresponds to the bright-dot detection result of each pixel in the DUT image, where the blemishes are excluded. For example, the detection result of each pixel may be a binary value such as 0 or 1, where 1 may represent that the corresponding pixel is a bright dot, and 0 may represent that the corresponding pixel is a normal pixel.

Figure 4A:
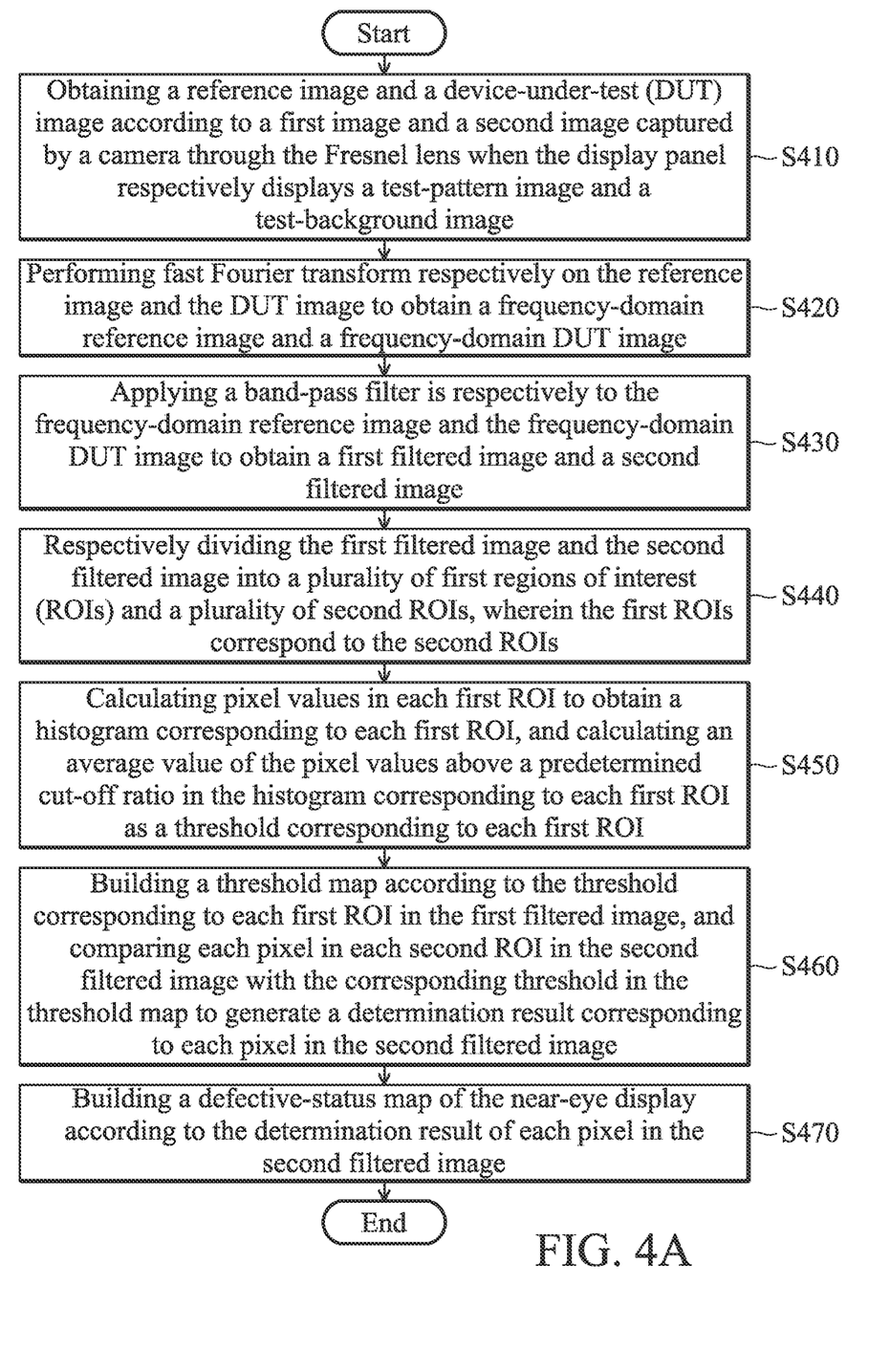
FIG. 4A is a flow chart of a method for detecting defects in a near-eye display in accordance with an embodiment of the invention.

FIG. 4A is a flow chart of a method for detecting defects in a near-eye display in accordance with an embodiment of the invention.

In step S410, a reference image and DUT image are obtained according to a first image and a second image captured by the camera 300 through the Fresnel lens when the display panel respectively displays a test-pattern image and a test-background image. For example, the display panel (e.g., may be the left-eye display panel 210 or the right-eye display panel 220) of the near-eye display 200 may display the test-pattern image and the test-background image, and the camera 300 may respectively capture the test-pattern image and test-background image displayed on the display panel through the Fresnel lens (e.g., may be the corresponding lens 211 or 221) to obtain the first image and the second image. In some embodiments, the first image and second image may be HDR images obtained by performing image fusion on a plurality of exposure images using different exposure values. In the blemish-detection procedure, the computation apparatus 100 may directly set the first image and the second image as the reference image and the DUT image, respectively. In the bright-dot detection procedure, step S410 can be divided into steps S401 to S404, details of which can be referred to the procedure in FIG. 4B.

In step S420, fast Fourier transform is respectively performed on the reference image and the DUT image to obtain a frequency-domain reference image and a frequency-domain DUT image.

In step S430, a band-pass filter is respectively applied to the frequency-domain reference image and the frequency-domain DUT image to obtain a first filtered image and a second filtered image. Each pixel value in the first filtered image and the second filtered image may be a normalized value between 0 and 1 that can reflect the variation of each pixel value in the reference image and DUT image. In some embodiments, the computation apparatus 100 can apply a band-pass filter and a de-moire filter on the frequency-domain reference image and the frequency-domain DUT image to obtain the first filtered image and the second filtered image, respectively.

In step S440, the first filtered image and the second filtered image are respectively divided into a plurality of first ROIs and a plurality of second ROIs, wherein the first ROIs correspond to the second ROIs.

In step S450, pixel values in each first ROI are calculated to obtain a histogram that corresponds to each first ROI, and the average value of the pixel values above a predetermined cut-off ratio in the histogram corresponding to each first ROI is calculated as a threshold of each first ROI.

In step S460, a threshold map is built that includes the threshold of each first ROI in the first filtered image, and each pixel in each second ROI in the second filtered image is compared with the corresponding threshold in the threshold map to generate a determination result for each pixel in the second filtered image. For example, each pixel in each ROI will be compared with the threshold in the corresponding location of the threshold map. If the pixel value of a specific pixel in the second filtered image is greater than or equal to the threshold of the corresponding ROI, the computation apparatus 100 will determine that the specific pixel is a blemish.

In step S470, a defective-status map of the near-eye display 200 is built according to the determination result of each pixel in the second filtered image. For example, each value in the defective-status map may correspond to the blemish-determination result of each pixel in the DUT image. For example, the determination of each pixel may be a binary value such as 0 or 1, where 1 may represent that the corresponding pixel is a blemish, and 0 may represent that the corresponding pixel is a normal pixel.

Figure 4B:
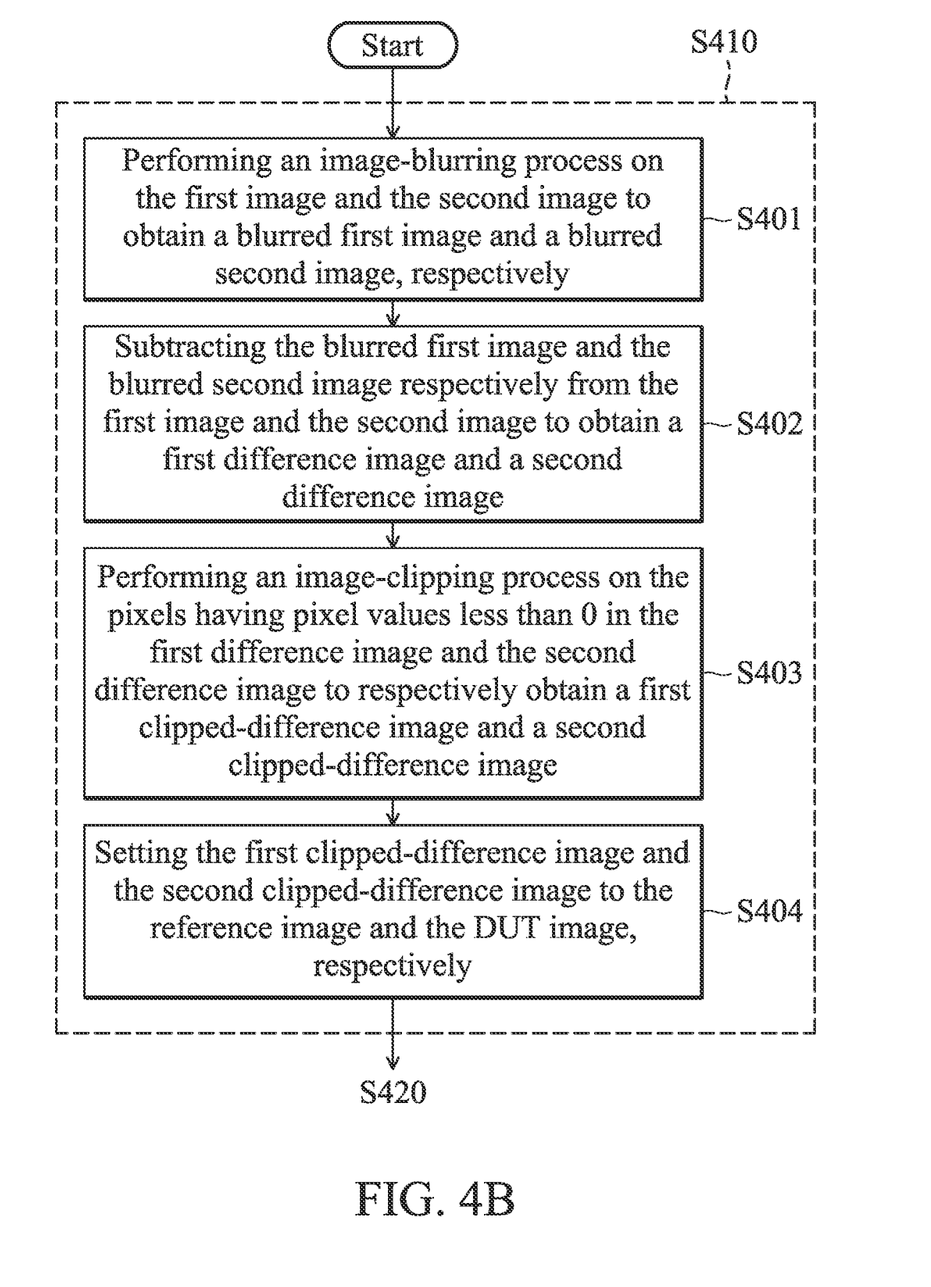
FIG. 4B is a flow chart of step 5410 in accordance with the embodiment of FIG. 4A.

FIG. 4B is a flow chart of step S410 in accordance with the embodiment of FIG. 4A. Please refer to FIG. 3 and FIGS. 4A and 4B.

In the bright-dot detection procedure, step S410 can be divided into steps S401 to S404. That is, the computation apparatus 100 may perform image pre-processing on the first image and the second image to obtain the reference image and the DUT image for bright-dot detection.

In step S401, an image-blurring process is performed on the first image and the second image to obtain a blurred first image and a blurred second image, respectively. For example, before performing bright-dot detection, the computation apparatus 100 needs to remove blemishes in the near-eye display 200. If there is dust or stains (i.e., blemishes) on the left-eye display panel 210 and lens 211, or right-eye display panel 220 and lens 221 of the near-eye display 200, the pixel values of one or more pixels corresponding to the blemishes in the first image will be close to 0, and thus the pixel values of the blemishes may vary greatly in comparison with the greyscale value of their surrounding pixels (e.g., 55 or 120). After performing the image-blurring process, the blemish pixels and their surrounding pixels in the first image and the second image can be smoothed, but the greyscale value of the smoothed pixel is slightly smaller than that of the pixel in the corresponding location of the blemish pixel.

In step S402, the blurred first image and the blurred second image are respectively subtracted from the first image and the second image to obtain a first difference image and a second difference image. For example, the greyscale value of the smoothed blemish pixel is slightly smaller than that of the background pixel in the corresponding location of the blemish pixel. Accordingly, the computation apparatus 100 can determine that the locations of pixels having a pixel value less than 0 in the first difference image and the second difference image as the locations of the blemish pixels.

In step S403, an image-clipping process is performed on the pixels having pixel values that are less than 0 in the first difference image and the second difference image to respectively obtain a first clipped-difference image and a second clipped-difference image. In order to eliminate the effect of blemishes on the bright-dot detection, the computation apparatus 100 can replace the pixels having pixel values that are less than 0 in the second difference image by the difference pixels in the smooth region (i.e., a region where the greyscale value does not change significantly) in the second image, or set the pixels having pixel values that are less than 0 in the second difference image to 0 to obtain the second clipped-difference image.

In step S404, the first clipped-difference image and the second clipped-difference image are set as the reference image and the DUT image, respectively.

In view of the above, a computer apparatus and a method for detecting defects in a near-eye display, which can solve the problem that the image displayed by the near-eye display will be blurred in the outer region and cause misjudgment of blemish detection. Different test-pattern images can be used to adjust different standards for bright-dot detection. Accordingly, the computer apparatus and the method for detecting defects in the near-eye display can more accurately detect the defects (i.e., including blemishes and bright dots), thereby ensuring the factory quality of the near-eye display.

The methods, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting defects in a near-eye display, wherein the near-eye display comprises a display panel and a Fresnel lens, the method comprising:
    obtaining a reference image and a device-under-test (DUT) image according to a first image and a second image captured by a camera through the Fresnel lens when the display panel respectively displays a test-pattern image and a test-background image;
    performing a fast Fourier transform on the reference image and the DUT image to respectively obtain a frequency-domain reference image and a frequency-domain DUT image;
    applying a band-pass filter to the frequency-domain reference image and the frequency-domain DUT image to respectively obtain a first filtered image and a second filtered image;
    dividing the first filtered image and the second filtered image into a plurality of first regions of interest (ROIs) and a plurality of second ROIs, respectively, wherein the first ROIs correspond to the second ROIs;
    calculating pixel values in each first ROI to obtain a histogram that corresponds to each first ROI, and calculating an average value of the pixel values above a predetermined cut-off ratio in the histogram corresponding to each first ROI as a threshold of each first ROI;
    building a threshold map that includes the threshold of each first ROI in the first filtered image, and comparing each pixel in each second ROI in the second filtered image with the corresponding threshold in the threshold map to generate a determination result for each pixel in the second filtered image; and
    building a defective-status map of the near-eye display according to the determination result of each pixel in the second filtered image;
    wherein the threshold of each first ROI decreases with distance of each first ROI from a center of the first filtered image.

2. The method as claimed in claim 1, wherein the method performs blemish detection, and the first image and the second image are the reference image and the DUT image, respectively.

3. The method as claimed in claim 2, wherein the test-background image is a white image, and the test-pattern image is the test-background image covered with a plurality of test points.

4. The method as claimed in claim 2, wherein the first image and the second image are HDR (high dynamic range) images obtained by performing image fusion on a plurality of first exposure images and a plurality of second exposure images, and the first exposure images and the second exposure images are captured by a camera with different exposure settings when the near-eye display displays the test-pattern image and the test-background image, respectively.

5. The method as claimed in claim 1, wherein the method performs bright-dot detection, and the test-background image comprises a central region and an outer region, and the central region and the outer region have a first greyscale value and a second greyscale value, and the second greyscale value is greater than the first greyscale value, and the test-pattern image is the test-background image covered with a plurality of test points.

6. The method as claimed in claim 5, wherein the central region is a region within a FoV (field of view) range from 0 to 0.5 in the test-background image, and the outer region is another region within the FoV range from 0.5 to 1 in the test-background image.

7. The method as claimed in claim 5, wherein the first image and the second image are HDR (high dynamic range) images obtained by performing image fusion on a plurality of first exposure images and a plurality of second exposure images, and the first exposure images and the second exposure images are captured by the camera with different exposure settings when the near-eye display displays the test-pattern image and the test-background image, respectively.

8. The method as claimed in claim 5, wherein the step of obtaining a reference image and a device-under-test (DUT) image according to a first image and a second image captured by a camera through the Fresnel lens when the display panel respectively displays a test-pattern image and a test-background image comprises:
    performing an image-blurring process on the first image and the second image to obtain a blurred first image and a blurred second image, respectively;
    subtracting the blurred first image and the blurred second image respectively from the first image and the second image to obtain a first difference image and a second difference image;
    performing an image-clipping process on the pixels having pixel values that are less than 0 in the first difference image and the second difference image to respectively obtain a first clipped-difference image and a second clipped-difference image; and
    setting the first clipped-difference image and the second clipped-difference image as the reference image and the DUT image, respectively.

9. A computation apparatus, for detecting defects in a near-eye display, wherein the near-eye display comprises a display panel and a Fresnel lens, the computation apparatus comprising:
    a non-volatile memory, configured to store a defect-detecting program; and
    a processor, configured to execute the defect-detecting program to perform the following steps:
    obtaining a reference image and a device-under-test (DUT) image according to a first image and a second image captured by a camera through the Fresnel lens when the display panel respectively displays a test-pattern image and a test-background image;
    performing a fast Fourier transform respectively on the reference image and the DUT image to obtain a frequency-domain reference image and a frequency-domain DUT image;
    applying a band-pass filter respectively to the frequency-domain reference image and the frequency-domain DUT image to obtain a first filtered image and a second filtered image;
    respectively dividing the first filtered image and the second filtered image into a plurality of first regions of interest (ROIs) and a plurality of second ROIs, wherein the first ROIs correspond to the second ROIs;
    calculating pixel values in each first ROI to obtain a histogram that corresponds to each first ROI, and calculating the average value of the pixel values above a predetermined cut-off ratio in the histogram corresponding to each first ROI as a threshold of each first ROI;

building a threshold map that includes the threshold of each first ROI in the first filtered image, and comparing each pixel in each second ROI in the second filtered image with the corresponding threshold in the threshold map to generate a determination result for each pixel in the second filtered image; and building a defective-status map of the near-eye display according to the determination result of each pixel in the second filtered image;

wherein the threshold of each first ROI decreases with distance of each first ROI from a center of the first filtered image.

* * * * *